(12) United States Patent
Moritomo

(10) Patent No.: US 8,953,487 B2
(45) Date of Patent: Feb. 10, 2015

(54) COMMUNICATION APPARATUS, COMMUNICATION SYSTEM, AND NETWORK ESTABLISHING METHOD

(75) Inventor: Kazuo Moritomo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 677 days.

(21) Appl. No.: 12/352,266

(22) Filed: Jan. 12, 2009

(65) Prior Publication Data

US 2009/0196200 A1    Aug. 6, 2009

(30) Foreign Application Priority Data

Feb. 5, 2008    (JP) ................................. 2008-025736

(51) Int. Cl.
| | |
|---|---|
| *H04L 12/28* | (2006.01) |
| *H04W 16/00* | (2009.01) |
| *H04W 24/00* | (2009.01) |
| *H04W 28/18* | (2009.01) |
| *H04W 88/06* | (2009.01) |

(52) U.S. Cl.
CPC .............. *H04W 16/00* (2013.01); *H04W 24/00* (2013.01); *H04W 28/18* (2013.01); *H04W 88/06* (2013.01)
USPC ......... 370/254; 370/395.5; 370/400; 370/466

(58) Field of Classification Search
None
See application file for complete search history.

(56) References Cited

U.S. PATENT DOCUMENTS

| | | | | |
|---|---|---|---|---|
| 6,490,247 | B1 * | 12/2002 | Gilbert et al. ................ | 370/222 |
| 7,277,409 | B1 * | 10/2007 | Thermond et al. ........... | 370/328 |
| 2005/0101314 | A1 * | 5/2005 | Levi .............................. | 455/423 |
| 2005/0153735 | A1 * | 7/2005 | Morioka et al. ........... | 455/553.1 |
| 2005/0163080 | A1 * | 7/2005 | Suh et al. ...................... | 370/331 |
| 2008/0253391 | A1 * | 10/2008 | Krits et al. .................... | 370/466 |

FOREIGN PATENT DOCUMENTS

| | | |
|---|---|---|
| JP | 2009-527136 A | 7/2009 |
| WO | 2007082035 A | 7/2007 |

OTHER PUBLICATIONS

Cheap Fast and Easy are Deciding factors Find the Latest, Naoaki Oguro, Dec. 1, 2005 ( Japanese Document0.
The above references were cited in a Oct. 19, 2012 Japanese Office Action, which is enclosed without English Translation, that issued in Japanese Patent Application No. 2008-025736.

* cited by examiner

*Primary Examiner* — Gregory Sefcheck
*Assistant Examiner* — Daniel Mitchell
(74) *Attorney, Agent, or Firm* — Cowan, Liebowitz & Latman, P.C.

(57) ABSTRACT

A communication apparatus determines whether another communication apparatus participating in a network established in accordance with a first communication standard is also compatible with a second communication standard. The communication apparatus detects leaving of the network by another communication apparatus incompatible with the second communication standard. The communication apparatus establishes a network that adheres to the second communication standard, depending on the detection result.

20 Claims, 12 Drawing Sheets

SSID=Network_b

SSID=Network_b
OR
SSID=Network_n

COMMUNICATION APPARATUS, COMMUNICATION SYSTEM, AND NETWORK ESTABLISHING METHOD

BACKGROUND OF THE INVENTION

1. Field of the Invention

The present invention relates to a communication apparatus, a communication system and a network establishing method, and particularly relates to a technique for switching communication standards applied to a network depending on the compatibility of communication apparatuses with communication standards.

2. Description of the Related Art

With a wireless LAN, an infrastructure mode and an ad hoc mode are known as communication modes by which a plurality of communication apparatuses communicate. With the infrastructure mode, communication apparatuses communicate with one another via a base station (access point). With the ad hoc mode, on the other hand, communication apparatuses communicate directly rather than via an access point.

With the ad hoc mode, communication apparatuses transmit a broadcast signal called a beacon on a rotational basis since there is no access point. In order for the communication apparatuses to maintain the network, each beacon contains network synchronization information and transmission rate information in addition to network identification information (SSID) and the MAC address of the source. Beacons are broadcast. To connect to a network in the ad hoc mode, a communication apparatus conducts a network search. The communication apparatus conducts this search by transmitting a probe request as a search signal.

Another communication apparatus, having received a beacon, sends back a probe response as a response signal. A given communication apparatus, when unable to receive a probe response despite having transmitted a fixed number of probe requests, judges that a network for connecting to does not exist, and establishes a network by starting to transmit beacons.

When able to receive a probe signal, the communication apparatus joins the network to which the communication apparatus that sent the probe response belongs.

The above wireless LAN standards are contained in the following document.

IEEE STD 802.11-1999 Part 11, Wireless LAN Medium Access Control (MAC) and Physical Layer (PHY) Specifications.

SUMMARY OF THE INVENTION

In recent years, IEEE 802.11n compatible with faster transmission has been formulated in addition to IEEE 802.11b/a/g. However, issues related to establishing a network have arisen due to the emergence of this new communication standard.

Assume, for example, that a communication apparatus compliant with IEEE 802.11b establishes an ad hoc network that adheres to IEEE 802.11b. Further, assume that a plurality of communication apparatuses compliant with IEEE 802.11n join this network. In this case, the communication apparatuses compliant with IEEE 802.11n perform communication in accordance with IEEE 802.11b. Subsequently, the IEEE 802.11b communication apparatus leaves the network, creating a situation in which only communication apparatuses compatible with IEEE 802.11n exist on the network.

However, the plurality of communication apparatuses compatible with IEEE 802.11n are unable to perform communication compliant with IEEE 802.11n. This is because the network was established based on IEEE 802.11b. Consequently, despite having the capability for high speed communication, this capability cannot be exercised.

In view of this, the present invention is characterized in solving at least one of these and other problems. For example, the present invention is characterized in reestablishing a network depending on the compatibility of the communication apparatuses with communication standards. In other words, the present invention is characterized in switching communication standards applied to a network depending on the communication standards with which communication apparatuses participating in the network are compatible. Note that other problems will become apparent throughout the description.

The present invention provides a communication apparatus comprising:

a determination device which determines whether another communication apparatus participating in a network established in accordance with a first communication standard is also compatible with a second communication standard;

a detection device which detects leaving of the network by another communication apparatus that is incompatible with the second communication standard; and an establishing device which establishes a network that adheres to the second communication standard, depending on a result of the detection by the detection device.

The present invention still provides a communication system. The communication system comprises a plurality of communication apparatuses. At least one of the plurality of communication apparatuses includes:

a determination device which determines whether another communication apparatus participating in a network established in accordance with a first communication standard is also compatible with a second communication standard;

a detection device which detects leaving of the network by another communication apparatus that is incompatible with the second communication standard; and an establishing device which establishes a network that adheres to the second communication standard, depending on a result of the detection by the detection device.

The present invention further provides a network establishing method of a communication apparatus. The method comprises the steps of:

determining whether another communication apparatus participating in a network established in accordance with a first communication standard is also compatible with a second communication standard;

detecting leaving of the network by another communication apparatus that is incompatible with the second communication standard; and establishing a network that adheres to the second communication standard, depending on a result of the detection.

Further features of the present invention will become apparent from the following description of exemplary embodiments (with reference to the attached drawings).

DESCRIPTION OF THE EMBODIMENTS

Preferred embodiments of the present invention will now be described. The individual embodiments described below will be helpful in understanding the various concepts of the present invention from the generic to the more specific. Further, the technical scope of the present invention is defined by the claims, and is not limited by the following individual embodiments.

Hereinafter, a method of dynamically switching to a higher communication standard (communication system) compatible with all communication apparatuses participating in an ad hoc type network in which a plurality of communication apparatuses serving as wireless terminals communicate directly. With an ad hoc type network, the communication standard with which the majority of communication apparatuses are compliant is variable, given the possibility of communication apparatuses leaving the network at any time. Therefore, a network that employs a higher communication standard can be readily reestablished when an arbitrary terminal leaves the network, provided that the compatibility of the communication apparatuses with the communication standards is known.

Hereinafter, in the interest of facilitating description, IEEE 802.11b will be employed as an exemplary lower communication standard and IEEE 802.11n will be employed as an exemplary higher communication standard. However, it should be clear that the technical ideas of the present invention are not limited to only these communication standards. Ad hoc type networks are referred to differently depending on the difference in standards. Here, "ad hoc network" is used to generically refer to a network in which a plurality of communication apparatuses communicate directly.

First Embodiment

Figure 1:
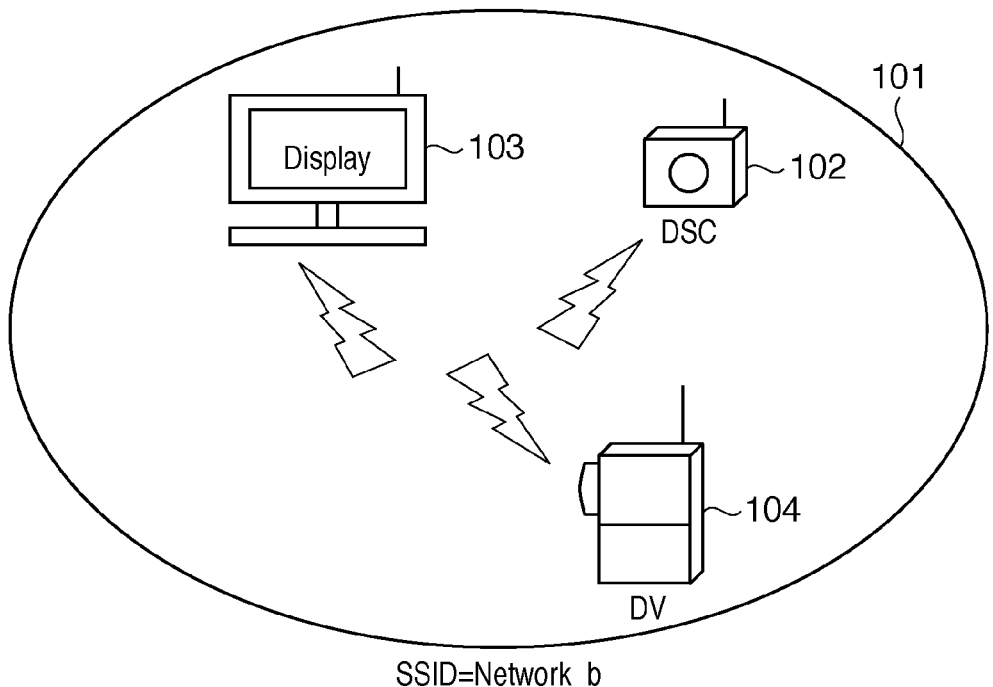
FIG. 1 shows an exemplary wireless network established in compliance with a lower communication standard according to a preferred embodiment.

FIG. 1 shows an exemplary network established in compliance with a lower communication standard according to the present embodiment. The network 101 is an exemplary ad hoc network in which a plurality of communication apparatuses wirelessly communicate directly. Here, the network 101 is established in accordance with the IEEE 802.11b ad hoc mode. Note that IEEE 802.11b is merely an exemplary lower communication standard. Here, a digital still camera (DSC) 102, a display 103 and a digital video camera (DV) 104 that serve as exemplary communication apparatuses are assumed to be included in the wireless communication system.

The DSC 102 is assumed to only be compatible with IEEE 802.11b and to have initially established the network 101 in the ad hoc mode. The SSID (Service Set Identification) serving as the network identification information of the network 101 is Network_b. The display 103 and the DV 104 are compatible with IEEE 802.11n. Note that the display 103 and the DV 104 will also be compatible with IEEE 802.11b and IEEE 802.11g, since IEEE 802.11n has backward compatibility.

Figure 2:
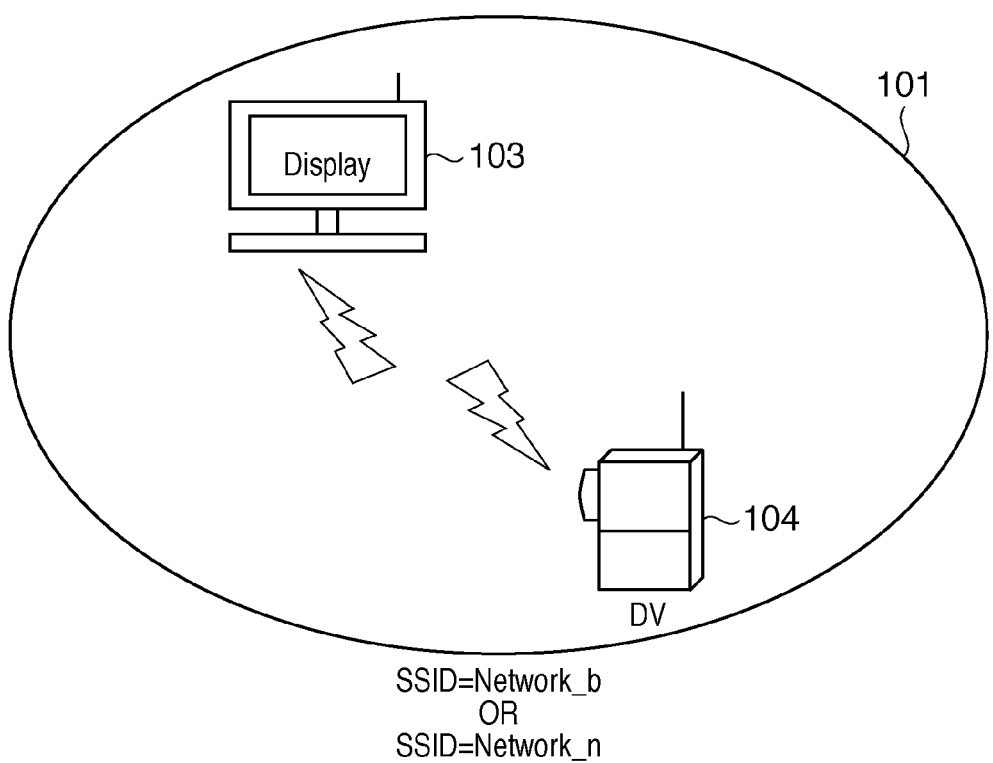
FIG. 2 shows an exemplary wireless network that a wireless terminal only compliant with a lower communication standard has left according to a preferred embodiment.

FIG. 2 shows an exemplary network that a communication apparatus only compliant with a lower communication standard has left according to the present embodiment. Here, the DSC 102 which is only compliant with IEEE 802.11b has left the network 101. Conventionally, the communication standard with which the network 101 is compliant would have been maintained as IEEE 802.11b, but by employing the present invention, the communication standard is switched to the higher IEEE 802.11n.

Figure 3:
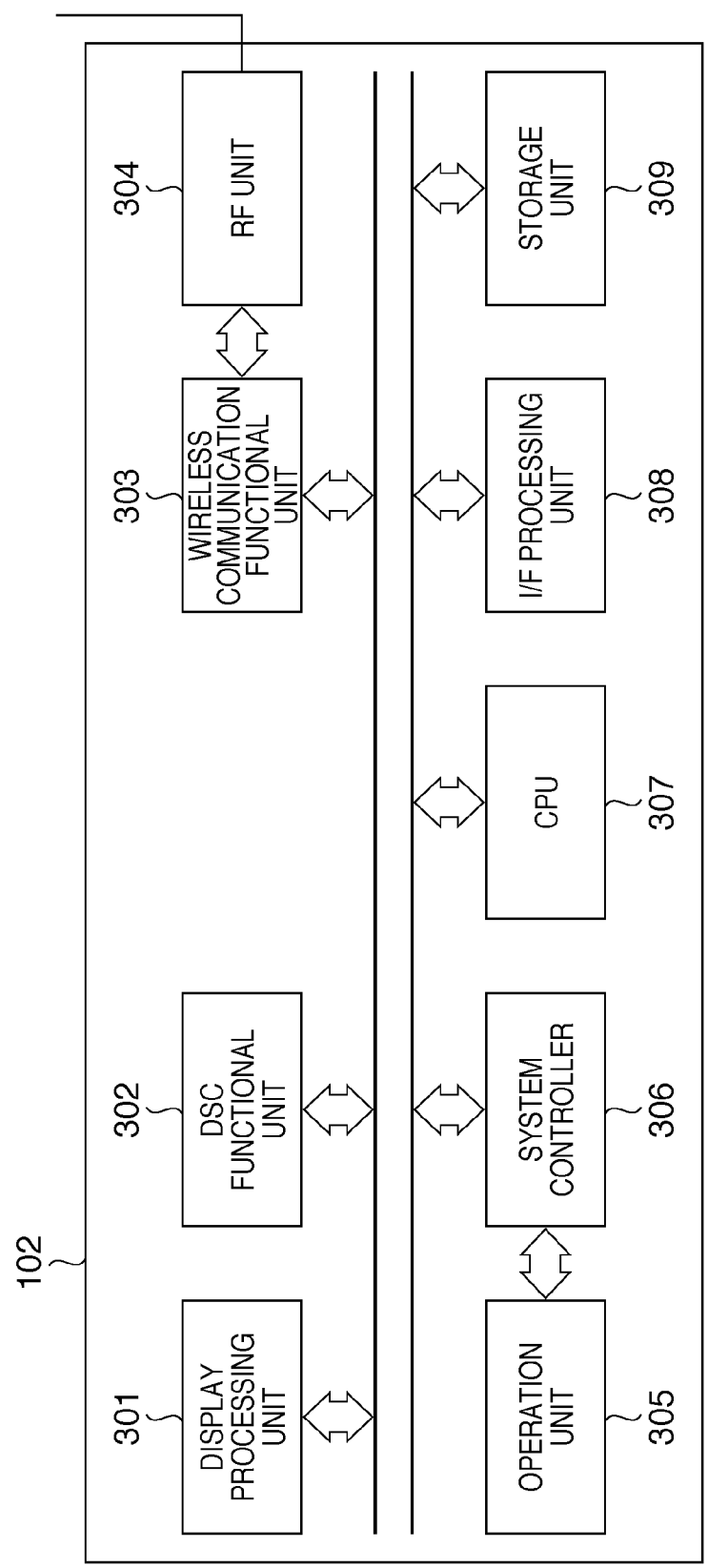
FIG. 3 is a block diagram of a digital still camera according to a preferred embodiment.

FIG. 3 is a block diagram of a digital still camera according to the present embodiment. A display processing unit 301 includes a display apparatus, LEDs, and a display control circuit. A DSC functional unit 302 is an image sensor, an image processing circuit or the like that takes images. A wireless communication functional unit 303 is a wireless communication circuit conforming to IEEE 802.11b, and mainly handles baseband processing. The wireless communication functional unit 303 constitutes an exemplary broadcast signal transmission device (broadcast device) that transmits a beacon (broadcast signal) when the turn of the communication apparatus (here, DSC 102) arrives to transmit the broadcast signal, which each of the plurality of communication apparatuses participating in the wireless network transmit in order. A radio frequency (RF) unit 304 includes a high frequency circuit, an antenna and the like.

An operation unit 305 includes switches, buttons or the like. An operation signal from the operation unit 305 is transmitted to a CPU 307 via a system controller 306. The CPU 307 is a control circuit that collectively controls the blocks. An interface (I/F) processing unit 308 is an interface circuit such as a USB or an IEEE 1394. A storage unit 309 is constituted by a RAM, a flash ROM or the like, and stores control programs and various data. In addition to an SSID and a MAC address, stored data includes standards information indicating which communication standards the communication apparatus (here, DSC 102) is compatible with. Processing by the digital still camera, which will be described below, is executed by controlling the various units as a result of the CPU 307 executing programs stored in the storage unit 309.

Figure 4:
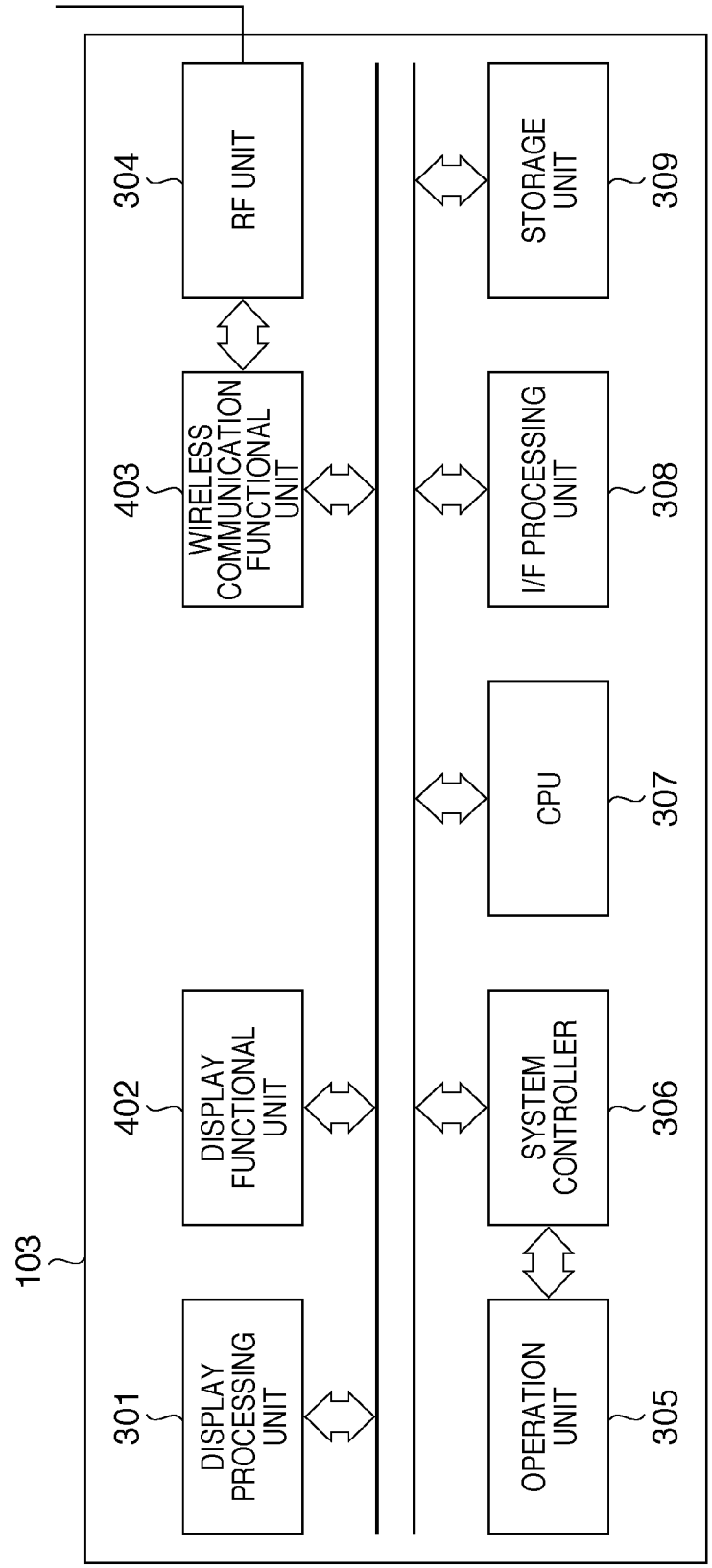
FIG. 4 is a block diagram of a display according to a preferred embodiment.

FIG. 4 is a block diagram of a display according to the present embodiment. Here, to simplify description, the display 103 is assumed to employ a configuration similar to the DSC 102. The display 103 is, however, provided with a display functional unit 402 instead of the DSC functional unit 302. The display function 402 is an LCD panel or the like, and is supplied with image signals by the display processing unit 301. A wireless communication functional unit 403 is a wireless communication circuit compatible with IEEE 802.11n. The wireless communication functional unit 403 constitutes an exemplary broadcast signal transmission device, since the plurality of communication apparatuses participating in the wireless network transmit beacons in order. Processing by the display, which will be described below, is also executed by controlling the various units as a result of the CPU 307 executing programs stored in the storage unit 309.

Figure 5:
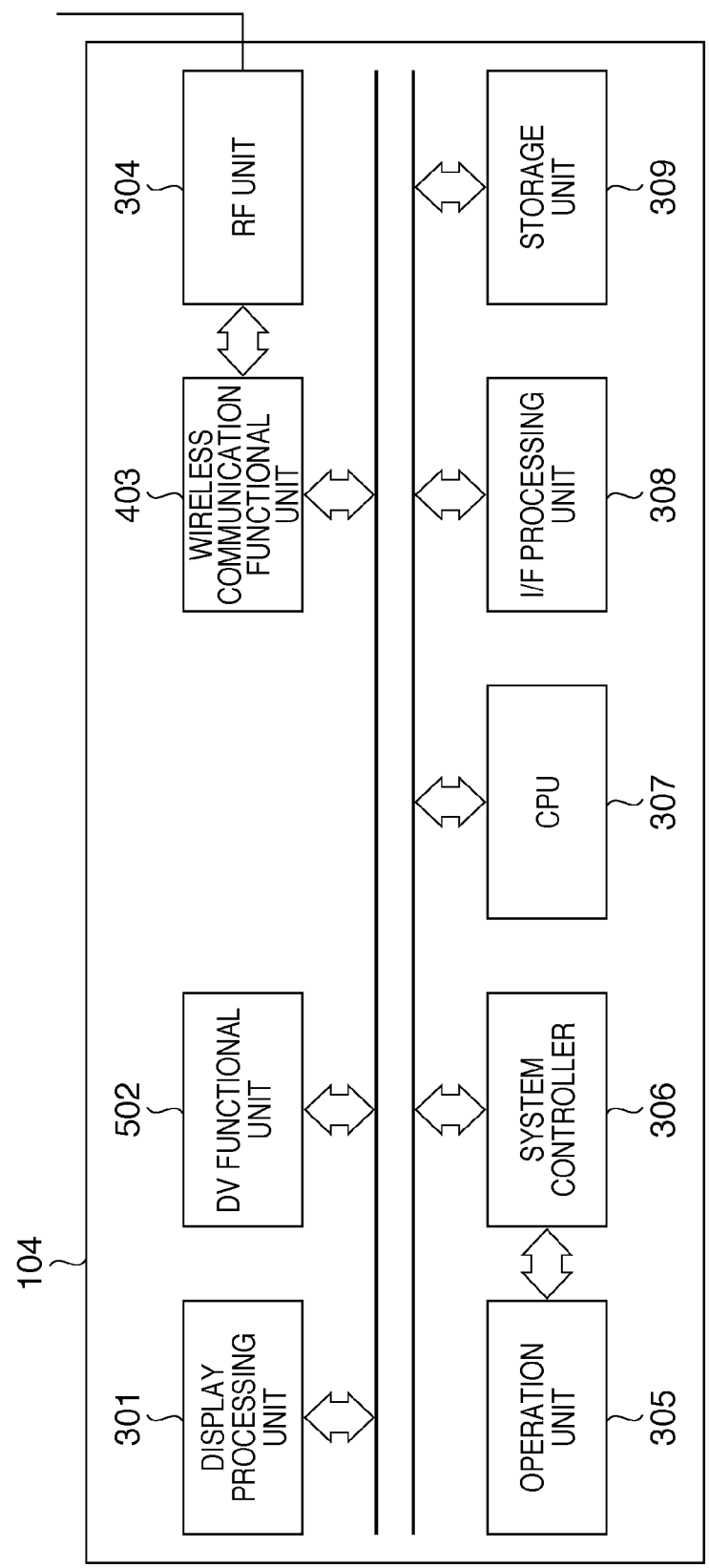
FIG. 5 is a block diagram of a digital video camera according to a preferred embodiment.

FIG. 5 is a block diagram of a digital video camera according to the present embodiment. Here, to simplify description, the DV 104 is assumed to have a configuration similar to the DSC 102. The DV 104 is, however, provided with a DV functional unit 502 instead of the DSC functional unit 302. The DV functional unit 502 is provided with an image sensor, a moving image processing circuit and the like. The DV 104 is also provided with a wireless communication functional unit 403 compatible with IEEE 802.11n. Processing by the digital video camera, which will be described below, is also executed by controlling the various units as a result of the CPU 307 executing programs stored in the storage unit 309.

Note that with the communication system shown in FIG. 1, the DSC 102 is able to wirelessly transmit still image data, and the display 103 is able to display still image data. Further, the DV 104 is able to wirelessly transmit recorded moving image data, and the display 103 is also able to display moving image data. These applications are merely illustrative. To playback moving image data with adequate image quality, however, the communication speed must be at or above a given speed. Therefore, with such examples, switching from an inadequate lower communication standard to a higher communication standard capable of high speed transmission is desirable.

In view of this, a method of switching to a network compliant with IEEE 802.11n when the DSC 102 leaves the network 101, such as shown in FIG. 2, will be described in detail hereinafter. The network compliant with IEEE 802.11b is terminated, and a network compliant with IEEE 802.11n is reestablished.

Figure 6:
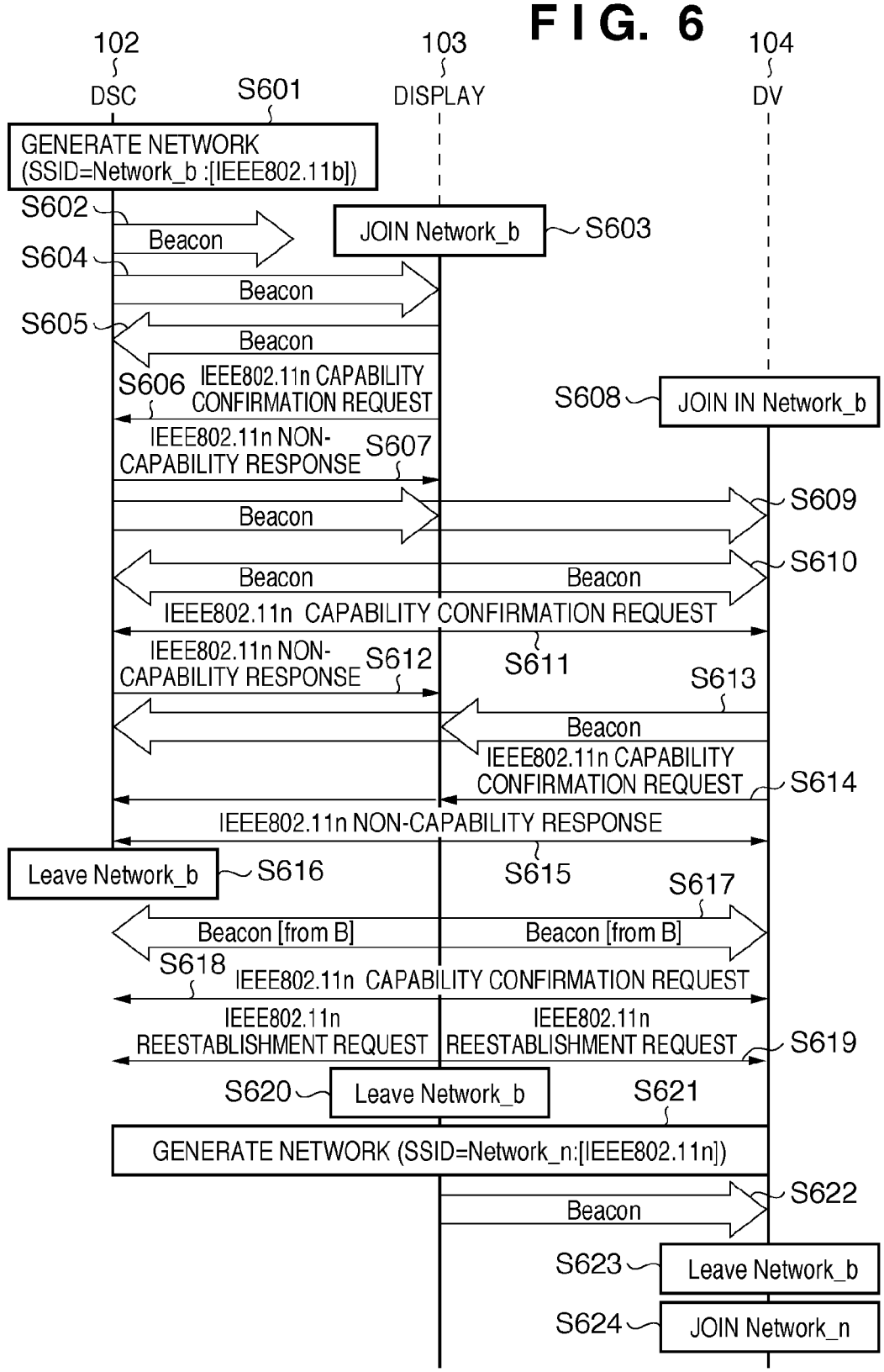
FIG. 6 is a sequence diagram showing an exemplary wireless network reestablishment method according to a preferred embodiment.

FIG. 6 is a sequence diagram showing an exemplary wireless network reestablishment method according to the present embodiment. Here, a capability confirmation request for inquiring about communication capability is transmitted following transmission of a beacon. Beacons are generally broadcast. Here, the display 103 constitutes an exemplary first communication apparatus that inquires about capability, and the DSC 102 and the DV 104 are exemplary second communication apparatuses that receive the capability inquiry.

At S601, the wireless communication functional unit 303 of the DSC 102 scans for a beacon serving as a broadcast signal, and, after confirming that a network does not exist in the vicinity, generates the network 101 compliant with IEEE 802.11b. At this time, the wireless communication functional unit 303 sets the SSID to Network_b.

At S602, the wireless communication functional unit 303 of the DSC 102 transmits a beacon that includes an SSID, a MAC address and the like via the RF unit 304.

At S603, the display 103 enters the communication area (coverage) of the network 101 and starts scanning for a beacon.

At S604, the wireless communication functional unit 303 of the DSC 102 transmits a beacon, and the wireless communication functional unit 403 of the display 103 receives this beacon. The wireless communication functional unit 403 of the display 103 reads out requisite setting information from the beacon and sets this information in the display 103.

At S605, the wireless communication functional unit 403 of the display 103 transmits a beacon via the RF unit when the turn of the display 103 to transmit a beacon arrives, and the wireless communication functional unit 303 of the DSC 102 receives this beacon. The wireless communication functional unit 303 of the DSC 102 thereby becomes aware that the display 103 has joined the network 101 as another communication apparatus.

Note that communication apparatuses participating in the network 101 transmit beacons in order. The order may be predetermined or random.

At S606, the wireless communication functional unit 403 of the display 103 broadcasts a capability confirmation request following transmission of the beacon, in order to confirm the IEEE 802.11n capability of other communication apparatuses participating in the network. The IEEE 802.11n capability confirmation request is an exemplary inquiry signal for inquiring whether other communication apparatuses participating in the network established in accordance with a first communication standard are also compatible with a second communication standard that is higher than the first communication standard. For example, the IEEE 802.11n capability confirmation request is a signal for inquiring whether another communication apparatus is equipped with a processing capability that adheres to IEEE 802.11n. Since the IEEE 802.11n capability confirmation request is transmitted via the wireless communication functional unit 403 and the RF unit 304, the wireless communication functional unit 403 and the RF unit 304 constitute an exemplary inquiry signal transmission device. The DSC 102 is the only other communication apparatus on the network 101 at this point in time. Therefore, the DSC 102 receives the IEEE 802.11n capability confirmation request.

At S607, the wireless communication functional unit 303 of the DSC 102 transmits an IEEE 802.11n non-capability response, in response (reply) to the capability confirmation request. This is because the wireless communication functional unit 303 is incompatible with IEEE 802.11n. The wireless communication functional unit 403 of the display 103 receives the IEEE 802.11n non-capability response. The wireless communication functional unit 403 of the display 103 is thereby able to know that a communication apparatus incompatible with IEEE 802.11n exists on the network 101 to which the display 103 belongs. Note that the DSC 102, being incompatible with IEEE 802.11n, does not transmit an IEEE 802.11n capability confirmation request following transmission of a beacon.

At S608, the DV 104 enters the communication area (coverage) of the network 101, and starts scanning for a beacon. Thereinafter, the DSC 102, the display 103 and the DV 104 transmit beacons in order.

At S609, the DSC 102 transmits a beacon. Further, at S610, the display 103 transmits a beacon. The wireless communication functional unit 403 of the DV 104, having received these beacons, reads out requisite setting information from the beacons and sets the read information in the DV 104.

At S611, the display 103 broadcasts an IEEE 802.11n capability confirmation request. The IEEE 802.11n capability confirmation request is received by the DSC 102 and the DV 104.

At S612, the DSC 102 sends back an IEEE 802.11n non-capability response to the display 103. Note that the DV 104, being compatible with IEEE 802.11n, does not send back an IEEE 802.11n non-capability response. The DV 104 also implements a similar procedure as follows.

At S613, the wireless communication functional unit 403 of the DV 104 transmits a beacon. The DSC 102 and the display 103, having received this beacon, become aware that the DV 104 has joined the network 101.

At S614, the DV 104 broadcasts an IEEE 802.1n capability confirmation request. The IEEE 802.11n capability confirmation request is received by the DSC 102 and the display 103.

At S615, the DSC 102 sends back an IEEE 802.11n non-capability response to the DV 104. Note that the display 103, being compatible with IEEE 802.11n, does not send back an IEEE 802.11n non-capability response. The wireless communication functional unit 403 of the DV 104 thereby finds out that a device incompatible with IEEE 802.11n exists on the network 101 to which the DV 104 belongs. Specifically, the DV 104 becomes aware that the display is compatible with IEEE 802.11n, and that the DSC is incompatible with IEEE 802.11n.

At S616, the DSC 102 leaves the network 101. Leaving the network arises, for example, when the DSC moves out of the communication area or when the DSC is powered off.

At S617, the display 103 transmits a beacon in accordance with the order. At S618, the display 103 broadcasts an IEEE 802.11n capability confirmation request. At this point, the DV 104 is the only other communication apparatus on the network 101. Consequently, there are no devices that will send back an IEEE 802.11n non-capability response. Therefore, the display 103, having been unable to receive an IEEE 802.11n non-capability response, judges that there are no devices on the network 101 that are incompatible with IEEE 802.11n. That is, the wireless communication functional unit 403 of the display 103 determines that all communication apparatuses participating in the network 101 are IEEE 802.11n compatible.

At S619, the wireless communication functional unit 403 of the display 103 starts the process of switching the standard with which the network 101 is compliant from IEEE 802.11b to IEEE 802.11n. Specifically, the wireless communication functional unit 403 broadcasts an IEEE 802.11n reestablishment request. The reestablishment request may contain the SSID of the new network (e.g., Network_n), the channel to be used, and security information.

Note that the DV 104, on receipt of the reestablishment request, judges whether switching from IEEE 802.11b to IEEE 802.11n will cause any problems. For example, the CPU 307 of the DV 104 determines that there will be a problem in the case where the battery is low and there is a strong possibility of the battery running out if the switch is made from IEEE 802.11b to IEEE 802.11n. If a problem will arise due to switching communication standards, the wireless communication functional unit 403 sends back an IEEE 802.11n reestablishment rejection response. The wireless communication functional unit 403 of the display 103, on receipt of an IEEE 802.11n reestablishment rejection response, cancels network reestablishment. On the other hand, if there are no problems, the wireless communication functional unit 403 either sends back an IEEE 802.11n reestablishment acceptance response or does not send back any signal. Here, the DV 104 is assumed to not send back any signal.

At S620, the wireless communication functional unit 403 of the display 103 leaves the existing network (SSID=Network_b), since an IEEE 802.11n reestablishment rejection response was not received.

At S621, the wireless communication functional unit 403 of the display 103 establishes an ad hoc mode network (SSID=Network_n) compliant with IEEE 802.11n.

At S622, the wireless communication functional unit 403 of the display 103 transmits a beacon in which the SSID is set to Network_n. The DV 104 detects the beacon containing the SSID (=Network_n) notified by the IEEE 802.11n reestablishment request. If a beacon cannot be detected, the wireless communication functional unit 403 of the DV 104 judges that network reestablishment was not executed. On the other hand, if a beacon can be detected, at S623, the wireless communication functional unit 403 of the DV 104 leaves the network (SSID=Network_b). Then, at S624, the wireless communication functional unit 403 of the DV 104 joins the new network (SSID=Network_n).

Figure 7:
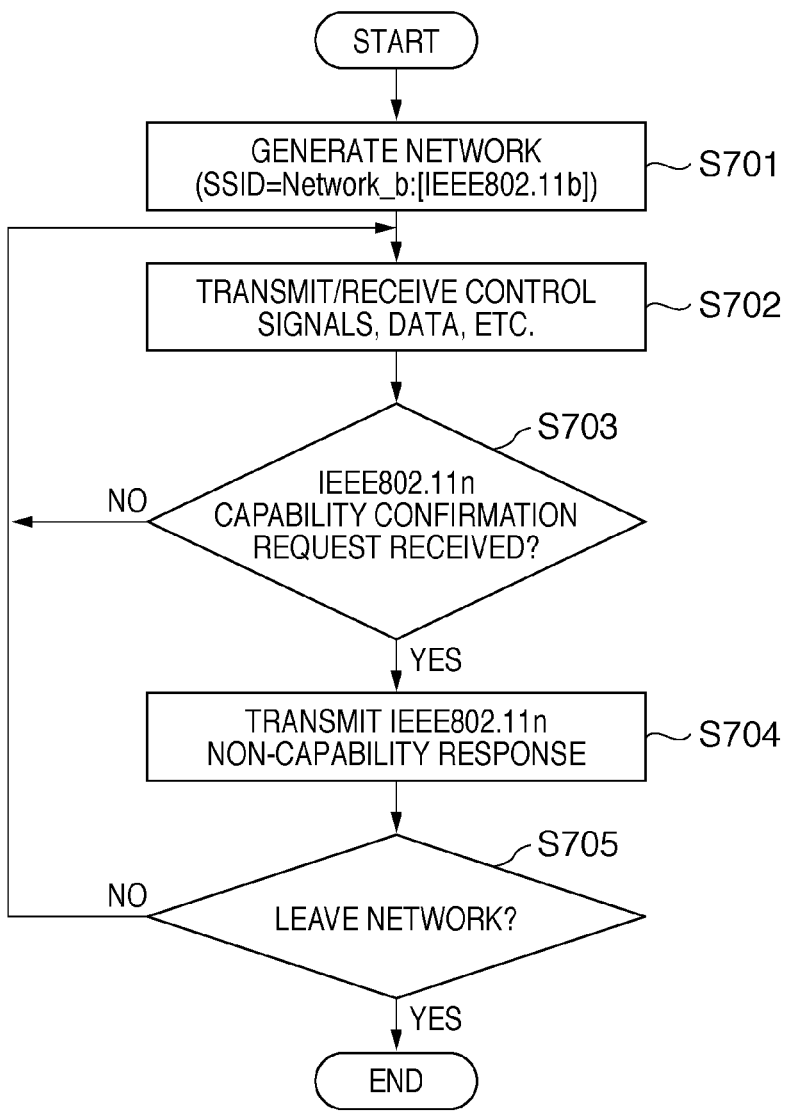
FIG. 7 is a flowchart showing an exemplary control method of a wireless terminal that is incompatible with a higher communication standard.

FIG. 7 is a flowchart showing an exemplary control method of a communication apparatus (DSC 102) that is incompatible with a higher communication standard.

At S701, the wireless communication functional unit 303 scans for a beacon, and after confirming that a network does not exist in the vicinity, generates a network 101 compliant with IEEE 802.11b. At this time, the wireless communication functional unit 303 sets the SSID to Network_b. At S702, the wireless communication functional unit 303 transmits and receives beacons, control signals, data and the like.

At S703, the wireless communication functional unit 303 determines whether a capability confirmation request has been received from another communication apparatus. If not received, the processing returns to step S702. On the other hand, if received, the processing proceeds to step S704.

At S704, the wireless communication functional unit 303 transmits an IEEE 802.11n non-capability response. The non-capability response is an exemplary explicit response signal indicating that the communication apparatus is incompatible with the second communication standard. Therefore, when an explicit response signal is sent back, the communication apparatus that transmitted the capability confirmation request can be aware that another communication apparatus incompatible with the higher standard exists.

On the other hand, an explicit response signal indicating that a communication apparatus is compatible with a higher standard may be employed. In this case, when there is an implicit response whereby another communication apparatus does not reply to an inquiry signal, it will be determined that this other terminal is incompatible with the higher standard. Here, the wireless communication functional unit 303 constitutes an exemplary response signal transmission device that transmits an explicit response signal indicating that the communication apparatus (DSC 102) is incompatible with the second communication standard.

At S705, the wireless communication functional unit 303 determines whether to leave the network. Leaving a network arises, for example, when a beacon can no longer be received from any other communication apparatuses, the communication apparatus is powered off, or the wireless communication functional unit shifts to power saving mode. If not leaving the network, the processing returns to step S702, and if leaving the network, the processing according to the present flowchart is ended.

Figure 8:
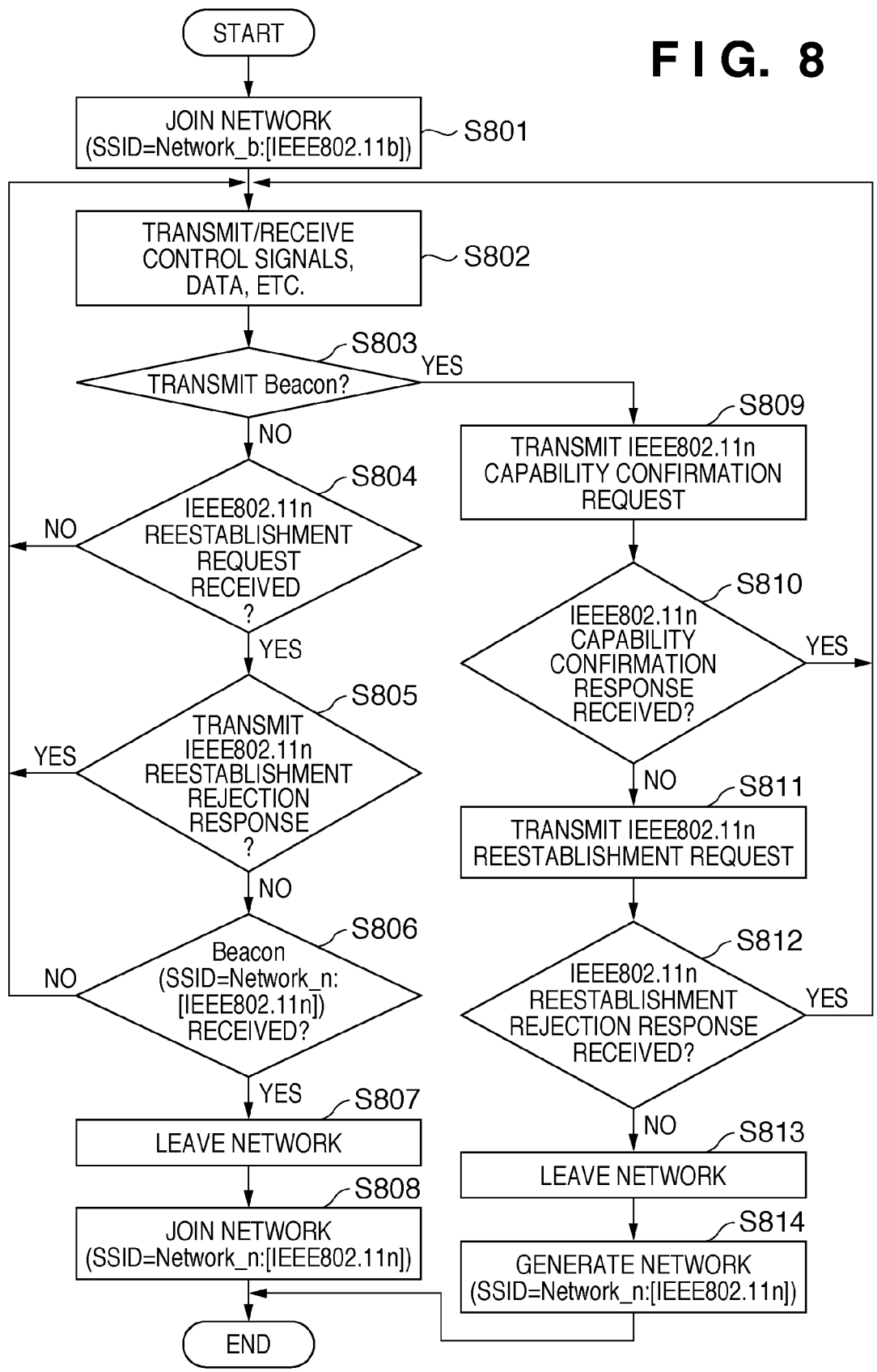
FIG. 8 is a flowchart showing an exemplary control method of a wireless terminal that is compatible with a higher communication standard.

FIG. 8 is a flowchart showing an exemplary control method of a communication apparatus (display 103, DV 104) that is compatible with a higher communication standard. As noted above, network reestablishment is started when other communication apparatuses (DSC 102) that were compatible with the first communication standard but not with the second communication standard leave the network established in accordance with the first communication standard.

At S801, the wireless communication functional unit 403 receives a beacon transmitted by another communication apparatus and joins the network 101. At S802, the wireless communication functional unit 403 transmits and receives beacons, controls signals, data and the like.

At S803, the wireless communication functional unit 403 determines whether the turn of the communication apparatus (display 103, DV 104) to transmit a beacon has arrived. This order may be predetermined or decided randomly. If the turn of the communication apparatus to transmit a beacon has not arrived, the processing proceeds to the step S804. At S804, the wireless communication functional unit 403 determines whether an IEEE 802.11n reestablishment request has been received. If not received, the processing returns to step S802. On the other hand, if received, the processing proceeds to step S805.

At S805, the wireless communication functional unit 403 determines whether to reject or accept reestablishment. When rejecting reestablishment, the wireless communication functional unit 403 transmits a rejection signal, and the processing returns to step S802. Note that the wireless communication functional unit 403 constitutes an exemplary rejection signal reception device that receives a rejection signal that indicates rejecting switching from another communication apparatus compatible with the second communication standard.

On the other hand, when accepting reestablishment, the processing proceeds to step S806. At S806, the wireless communication functional unit 403 determines whether a beacon compliant with IEEE 802.11n has been received. If not received, the processing returns to step S802. On the other hand, if received, the processing proceeds to step S807.

At S807, the wireless communication functional unit 403 leaves the network. For example, the wireless communication functional unit 403 initializes setting information relating to the network. At S808, the wireless communication functional unit 403 extracts the setting information included in the received beacon, writes the read information into the setting information of the communication apparatus (display 103, DV 104), saves the setting information in the storage unit, and participates in (joins) the reestablished network.

Incidentally, when, at step S803, the turn of the communication apparatus to transmit a beacon has arrived, the processing proceeds to step S809. At S809, the wireless communication functional unit 403 transmits an IEEE 802.11n capability confirmation request, together with transmitting a beacon.

At S810, the wireless communication functional unit 403 determines whether a capability confirmation response has been received. This is to determine whether other communication apparatuses are also compatible with the second communication standard, depending on the response from the other communication apparatuses. As noted above, a capability confirmation response will be transmitted by communication apparatuses incompatible with IEEE 802.11n. Therefore, when a capability confirmation response is received, this means that at least one communication apparatus is incompatible with IEEE 802.11n. On the other hand, if a capability confirmation response is not received, this means that all of communication apparatuses are compatible with IEEE 802.11n. If a capability confirmation response is received, the processing returns to step S802, since reestablishment cannot be performed. On the other hand, if a capability confirmation response is not received, the processing proceeds to step S811. Here, the wireless communication functional unit 403 constitutes an exemplary determination device because of determining the situation regarding compatibility with a higher standard. When a CPU performs the determination, this CPU will then be functioning as a determination device.

At S811, the wireless communication functional unit 403 transmits an IEEE 802.11n reestablishment request. The wireless communication functional unit 403 thus constitutes an exemplary establishing device that reestablishes a network that adheres to the second communication standard serving as a higher standard. The reestablishment request is an exemplary switching signal that indicates switching from the first communication standard to the second communication standard. Therefore, the wireless communication functional unit 403 and the RF unit 304 constitute an exemplary switching signal transmission device that transmits a switching signal.

At S812, the wireless communication functional unit 403 determines whether a reestablishment rejection response has been received. If received, the processing returns to step S802, since reestablishment cannot be performed. On the other hand, if not received, the processing proceeds to step S813. The wireless communication functional unit 403 thus constitutes an exemplary switching device that switches to the second communication standard if a rejection signal is not received and does not switch to the second communication standard if a rejection signal is received. Further, the wireless communication functional unit 403 constitutes an exemplary judgment device that judges whether switching to the second communication standard has been rejected, based on a response to the switching signal from another communication apparatus compatible with the second communication standard.

At S813, the wireless communication functional unit 403 leaves the current network. At S814, the wireless communication functional unit 403 reestablishes a network compliant with IEEE 802.11n.

As described above, the first embodiment enables communication standards applied to an ad hoc type network to be switched depending on the compatibility of the communication apparatuses with the communication standards. For example, once all communication apparatuses that are only compatible with a lower communication standard have left the network, the network can be reestablished in accordance with a higher communication standard. Normally, reestablishing a network in accordance with a higher communication standard is desirable since a higher communication standard is superior to a lower communication standard in terms of transmission speed and the like.

When an explicit response signal indicating incompatibility with a higher communication standard is received from a communication apparatus (S607, S615, S704, S810), switching to the higher communication standard is cancelled. On the other hand, if an explicit response signal indicating incompatibility with a higher communication standard is not received, switching to the higher communication standard is executed, enabling the advantages of the higher communication standard to be enjoyed.

Another communication apparatus compatible with the higher communication standard may, however, reject switching of communication standards. There are cases where maintaining a lower communication standard is desirable due to various factors. Therefore, a communication apparatus that has transmitted a switching signal that indicates switching from a lower communication standard to a higher communication standard cancels switching when a switching rejection signal is received, and executes switching when a rejection signal is not received.

Second Embodiment

Figure 9:
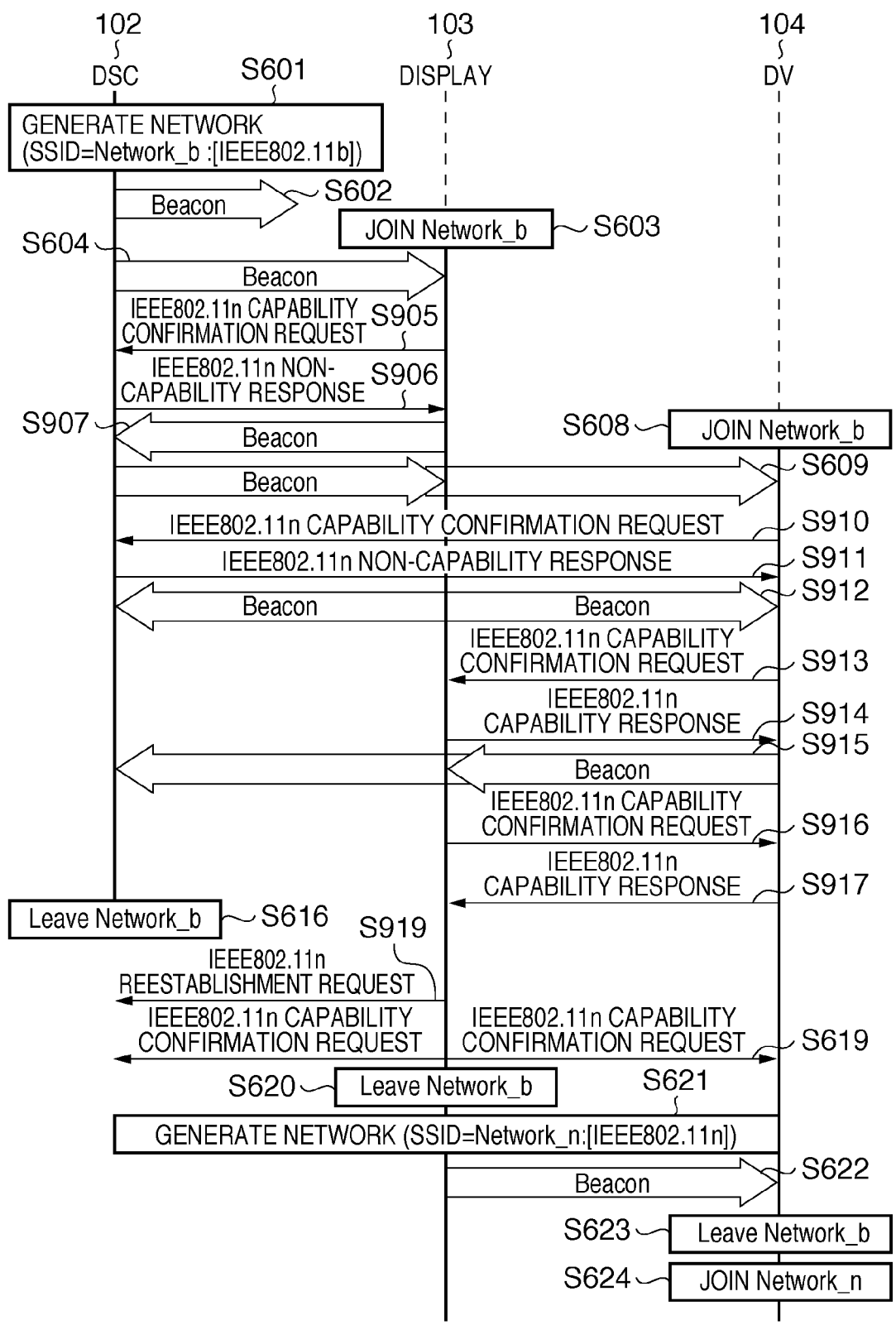
FIG. 9 is a sequence diagram showing an exemplary wireless network reestablishment method according to a preferred embodiment.

FIG. 9 is a sequence diagram showing an exemplary network reestablishment method according to the present embodiment. Note that description will be shortened by attaching the same reference numerals to portions common with FIG. 6.

At S604, the wireless communication functional unit 403 of the display 103 receives a beacon from the DSC 102. The wireless communication functional unit 403 reads out the MAC address contained in the beacon. The wireless communication functional unit 403 of the display 103 checks whether a beacon has previously been received from the communication apparatus assigned with this MAC address. For example, the wireless communication functional unit 403, on receipt of a new MAC address, stores the MAC address. Therefore, if the same MAC address as the received MAC address is already stored in the storage unit, the wireless communication functional unit 403 is able to determine that a beacon has previously been received from the communication apparatus assigned with this MAC address.

At S905, the wireless communication functional unit 403 of the display 103 transmits an IEEE 802.11n capability confirmation request addressed to the MAC address of the DSC 102. The capability confirmation request in this case is unicast.

At S906, the wireless communication functional unit 303 of the DSC 102, having received the capability confirmation request, sends back an IEEE 802.11n non-capability response to the display 103. The display 103, having received the non-capability response, stores response content that indicates incompatibility with IEEE 802.11n in the storage unit in association with the MAC address of the DSC 102. Further, the wireless communication functional unit 403 starts a first timer in order to periodically check whether the device (DSC 102) with this MAC address still exists on the network 101. The timeout value set for the first timer must be a suitable value proportional to the total number of communication apparatuses participating in the network 101. This is because the transmission interval at which the DSC 102 transmits a beacon increases the greater the total number of communication apparatuses. Therefore, the first timer must not time out as long as there are target communication apparatuses on the network 101.

At S907, the display 103 transmits a beacon, and the DSC 102 receives this beacon. At this time, the DSC 102, being incompatible with IEEE 802.11n, does not need to check the MAC address of the source or transmit an IEEE 802.11n capability confirmation request despite having received a beacon.

Subsequently, at the above S608, the DV 104 joins the network 101. At S609, the DSC 102 transmits a beacon, and the display 103 and the DV 104 receive this beacon. At this time, the display 103 checks the MAC address of the source of the beacon and resets the first timer. This is because a beacon has previously been received from the DSC 102. The first timer restarts counting again. The DV 104 receives a beacon from the DSC 102 for the first time. Therefore, the wireless communication functional unit 403 of the DV 104 stores the MAC address of the DSC 102 in the storage unit.

At S910, the wireless communication functional unit 403 of the DV 104 transmits an IEEE 802.11n capability confirmation request to the DSC 102. At S911, the wireless communication functional unit 403 of the DV 104 receives an IEEE 802.11n non-capability response from the DSC 102. The wireless communication functional unit 403 of the DV 104 stores response content indicating incompatibility with IEEE 802.11n in the storage unit in association with the MAC address of the DSC 102. Further, the wireless communication functional unit 403 starts a second timer in order to periodically check whether the device (DSC 102) with this MAC address still exists on the network 101.

At S912, the display 103 transmits a beacon, and the DSC 102 and the DV 104 receive this beacon. The DV 104 receives a beacon from the display 103 for the first time. Therefore, the wireless communication functional unit 403 of the DV 104 stores the MAC address of the display 103 in the storage unit.

At S913, the wireless communication functional unit 403 of the DV 104 transmits an IEEE 802.11n capability confirmation request to the display 103. At S914, the wireless communication functional unit 403 of the DV 104 either does not receive an IEEE 802.11n non-capability response or receives a response signal explicitly indicating compatibility with IEEE 802.11n (IEEE 802.11n capability response) from the display 103. The wireless communication functional unit 403 of the DV 104 stores response content indicating compatibility with IEEE 802.11n in the storage unit in association with the MAC address of the display 103. Further, the wireless communication functional unit 403 starts a third timer in order to periodically check whether the device (display 103) with this MAC address still exists on the network 101.

At S915, the DV 104 transmits a beacon, and the DSC 102 and the display 103 receive this beacon. The display 103 receives a beacon from the DV 104 for the first time. Therefore, the wireless communication functional unit 403 of the display 103 stores the MAC address of the DV 104 in the storage unit.

At S916, the wireless communication functional unit 403 of the display 103 transmits an IEEE 802.11n capability confirmation request to the DV 104. At S917, the wireless communication functional unit 403 of the display 103 either does not receive an IEEE 802.11n non-capability response or receives a response signal explicitly indicating compatibility with IEEE 802.11n (IEEE 802.11n capability response) from the DV 104. The wireless communication functional unit 403 of the display 103 stores response content indicating compatibility with IEEE 802.11n in the storage unit in association with the MAC address of the DV 104. Further, the wireless communication functional unit 403 of the display 103 starts a fourth timer in order to periodically check whether the device (DV 104) with this MAC address still exists on the network 101.

At S616, the DSC 102 leaves the network 101, which means that only communication apparatuses compatible with IEEE 802.11n remain on the network 101. The first timer times out since the display 103 is no longer able to receive a beacon from the DSC 102. Similarly, the second timer times out since the DV 104 is also no longer able to receive a beacon from the DSC 102. Here, for convenience of description, the first timer will be assumed to have timed out first.

At S919, the wireless communication functional unit 403 of the display 103 transmits an IEEE 802.11n capability confirmation request to the DSC 102 which was being monitored by the first timer that has timed out. However, there is no response to the request since the DSC 102 has already left the network. Therefore, the display 103 determines that all communication apparatuses incompatible with IEEE 802.11n no longer exist on the network 101. This is equivalent to determining that all communication apparatuses now belonging to the network 101 are compatible with IEEE 802.11n. Subsequently, the above S619 to S624 are executed, and a network compliant with IEEE 802.11n is reestablished.

Figure 10:
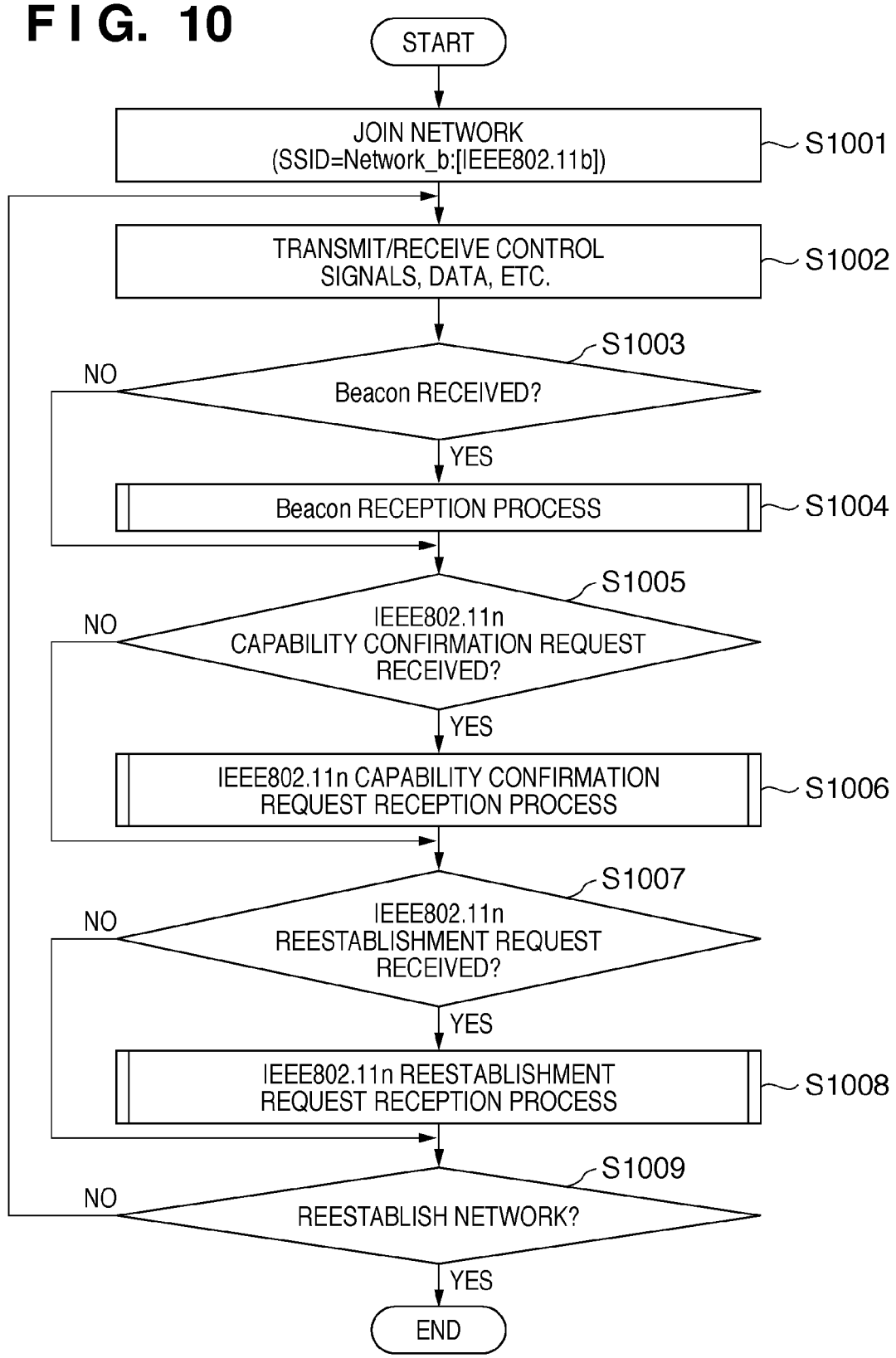
FIG. 10 is a flowchart showing an exemplary control method of a wireless terminal that is compatible with a higher communication standard according to a preferred embodiment.

FIG. 10 is a flowchart showing an exemplary control method of a communication apparatus (display 103, DV 104) compatible with a higher communication standard according to the present embodiment.

At step S1001, the wireless communication functional unit 403 receives a beacon transmitted from another communication apparatus and joins the network 101. At step S1002, the wireless communication functional unit 403 transmits and receives beacons, control signals, data and the like.

At step S1003, the wireless communication functional unit 403 controls the RF unit 304 and attempts to receive a beacon. When a beacon is detected before the timer times out, the processing proceeds to step S1004. At step S1004, the wireless communication functional unit 403 executes a process of receiving a beacon. This reception process will be described in detail below with reference to FIG. 11. If the timer times out without being able to detect a beacon, the wireless communication functional unit 403 determines that the communication apparatus has left the network, and the processing proceeds to step S1005. The wireless communication functional unit 403 thus constitutes an exemplary determination device that determines whether another communication apparatus has left the network, based on whether a broadcast signal can be received from the other communication apparatus. Note that when a communication apparatus whose MAC address is stored in the storage unit leaves the network, the wireless communication functional unit 403 deletes the entry relating to this communication apparatus. Entries include a MAC address and information indicating compatibility with communication standards. The wireless communication functional unit 403 thus constitutes an exemplary deletion device that deletes the content of a response signal corresponding to identification information on another communication apparatus that has left the network. That is, when the MAC addresses of all communication apparatuses incompatible with a higher communication standard are deleted from the storage unit, switching will be performed from the lower communication standard to the higher communication standard.

At step S1005, the wireless communication functional unit 403 determines whether an IEEE 802.11n capability confirmation request has been received. When received, the processing proceeds to step S1006. When not received, the processing proceeds to step S1007. At step S1006, the wireless communication functional unit 403 executes a process of receiving an IEEE 802.11n capability confirmation request. This reception process will be described in detail below with reference to FIG. 12.

At step S1007, the wireless communication functional unit 403 determines whether an IEEE 802.11n reestablishment request has been received. When received, the processing proceeds to step S1008. When not received, the processing proceeds to step S1009. At step S1008, the wireless communication functional unit 403 executes a process of receiving an IEEE 802.11n reestablishment request. This reception process will be described in detail below with reference to FIG. 13.

At step S1009, the wireless communication functional unit 403 determines whether to reestablish a network. When not reestablishing a network, such as in the case where reestablishment is rejected, the processing returns to step S1002. When reestablishing a network, the current processing is ended.

Figure 11:
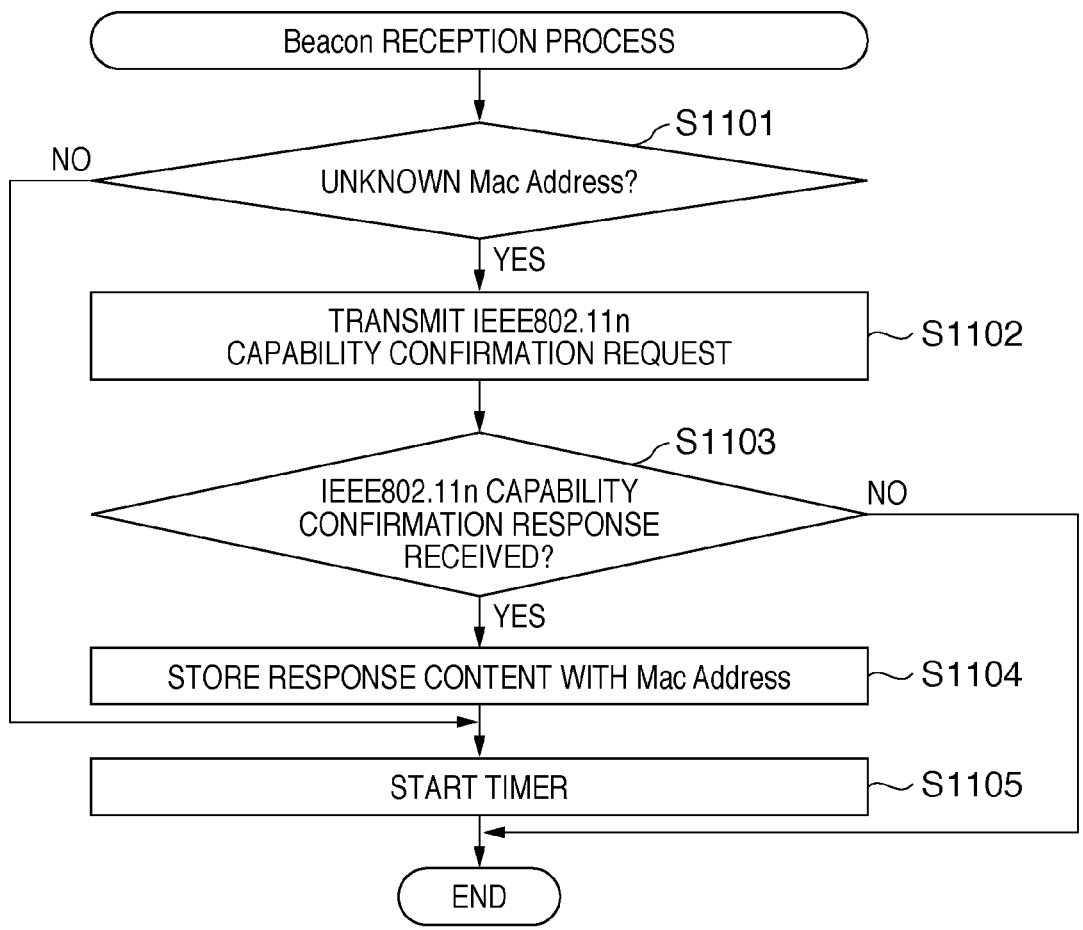
FIG. 11 is a flowchart showing an exemplary beacon reception process according to a preferred embodiment.

FIG. 11 is a flowchart showing an exemplary beacon reception process according to the present embodiment. This beacon reception process corresponds to the above step S1004.

At step S1101, the wireless communication functional unit 403 extracts the MAC address from the received beacon, and determines whether the extracted MAC address is an unknown MAC address not stored in the storage unit 309. If not an unknown MAC address, the processing proceeds to step S1105, and if an unknown MAC address, the processing proceeds to step S1102. At step S1102, the wireless communication functional unit 403 transmits an IEEE 802.11n capability confirmation request.

At step S1103, the wireless communication functional unit 403 determines whether an IEEE 802.11n capability confirmation response has been received. If not received, this subroutine is exited and the processing returns to the main routine shown in FIG. 10. If received, the processing proceeds to step S1104. At step S1104, the wireless communication functional unit 403 stores the content of the received response in the storage unit 309 in association with the extracted MAC address. For example, the wireless communication functional unit 403 may create a list of MAC addresses and save the list in the storage unit 309. A MAC address is exemplary identification information for identifying another communication apparatus contained in the broadcast signal received from the other communication apparatus. Therefore, the storage unit 309 constitutes an exemplary storage device that stores identification information in association with the content of a response signal received from another communication apparatus indicating whether the communication apparatus is compatible with the second communication standard.

At step S1105, the wireless communication functional unit 403 starts a timer for monitoring the other communication apparatus (in particular, those incompatible with IEEE 802.11n).

Figure 12:
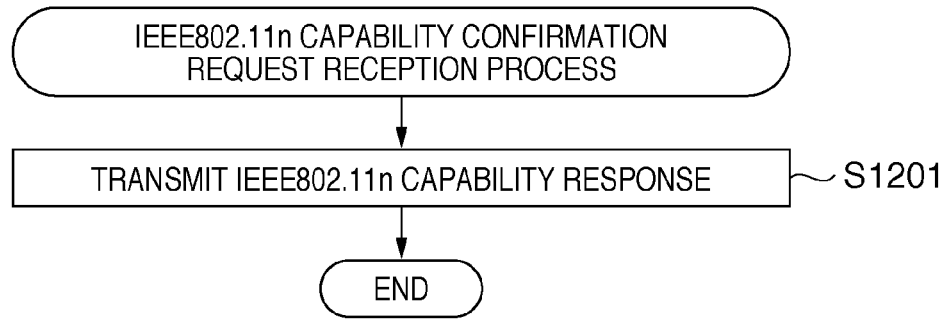
FIG. 12 is a flowchart showing an exemplary capability confirmation request reception process according to a preferred embodiment.

FIG. 12 is a flowchart showing an exemplary capability confirmation request reception process according to the present embodiment. This reception process corresponds to the above step S1006. At step S1201, the wireless communication functional unit 403 creates and transmits a capability response indicating compatibility with IEEE 802.11n.

Figure 13:
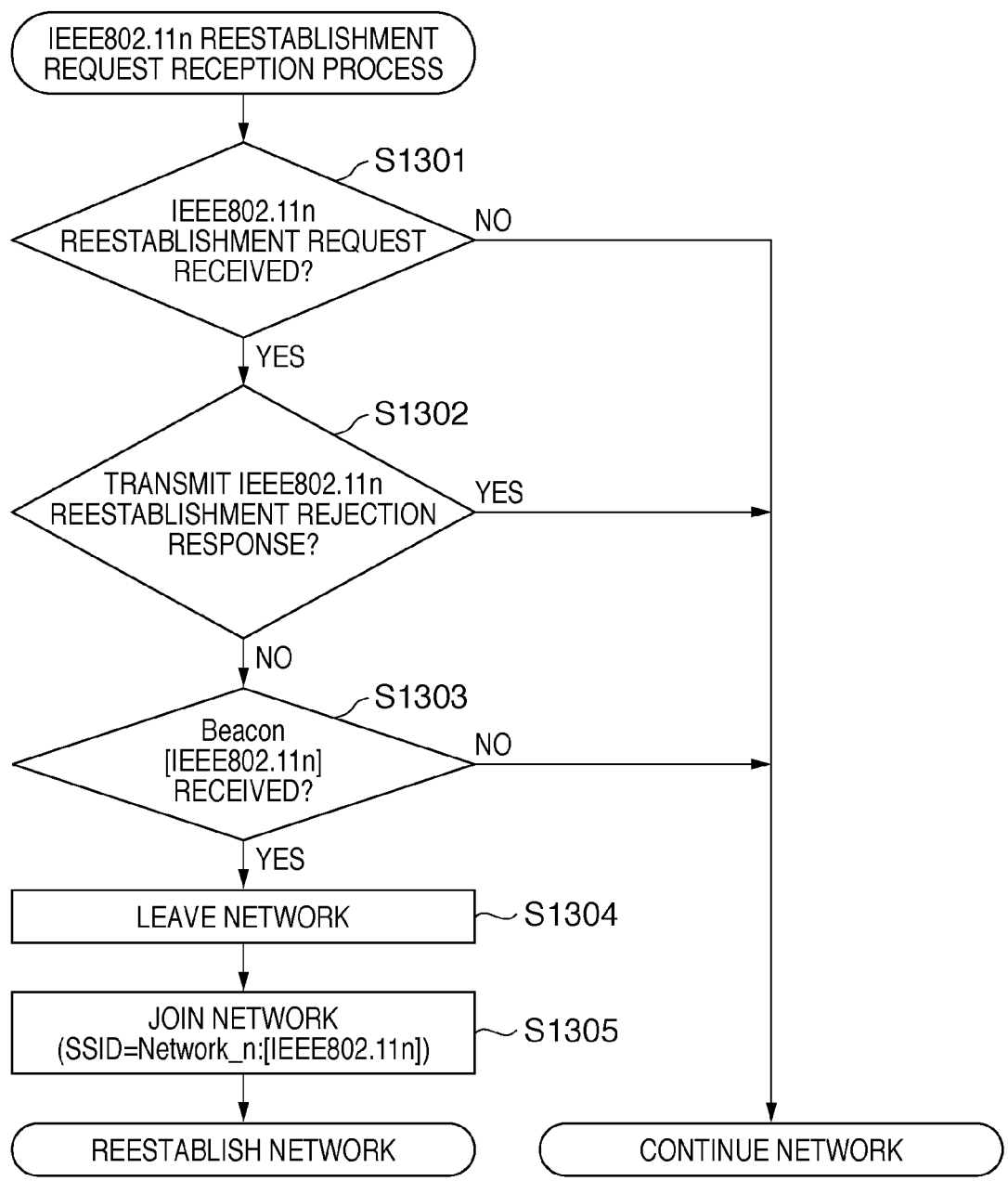
FIG. 13 is a flowchart showing an exemplary reestablishment request reception process according to a preferred embodiment.

FIG. 13 is a flowchart showing an exemplary reestablishment request reception process according to the present embodiment. This reception process corresponds to the above step S1008.

At step S1301, the wireless communication functional unit 403 determines whether an IEEE 802.11n reestablishment request has been received. If not received, the processing returns to the main routine. If received, the processing proceeds to step S1302.

At step S1302, the wireless communication functional unit 403 determines whether to transmit a response signal that indicates rejecting reestablishment as an IEEE 802.11n reestablishment response. If there is a problem with transferring to IEEE 802.11n, the wireless communication functional unit 403 transmits a rejection response signal, and the processing returns to the main routine. If accepting reestablishment, the wireless communication functional unit 403 either transmits an acceptance signal or does not transmit anything, after which the processing proceeds to step S1303.

At step S1303, the wireless communication functional unit 403 determines whether a beacon compatible with IEEE 802.11n has been received. If unable to receive a beacon, the wireless communication functional unit 403 determines that reestablishment has been cancelled, and the processing returns to the main routine. On the other hand, if a beacon has been received, the processing proceeds to step S1304.

At step S1304, the wireless communication functional unit 403 initializes the current wireless settings, and leaves the IEEE 802.11b network.

At step S1305, the wireless communication functional unit 403 extracts the SSID and the like from the received beacon, and reflects the extracted information in the wireless settings of the communication apparatus (display 103, DV 104). The communication apparatus thereby joins the newly formed IEEE 802.11n network.

Figure 14:
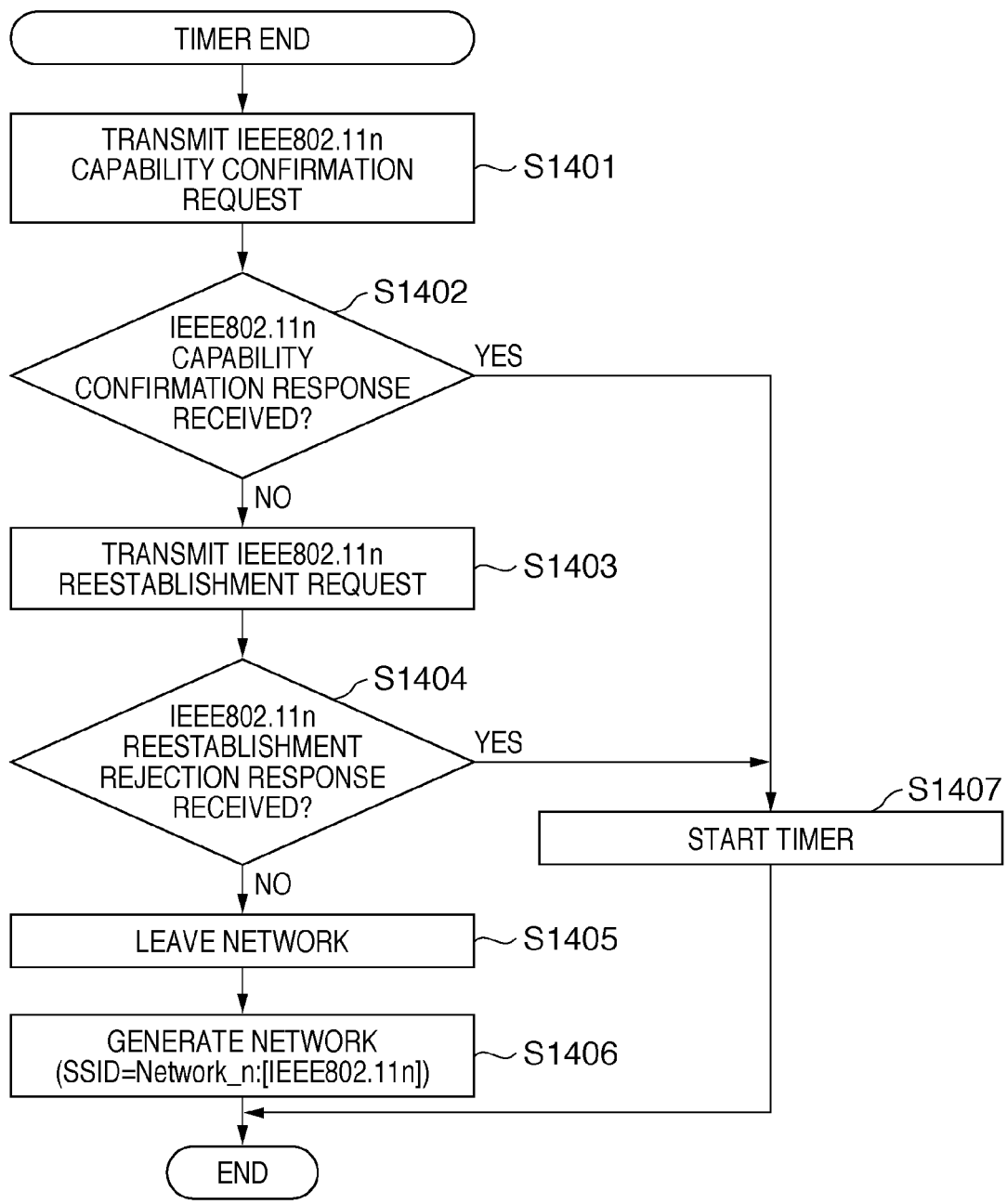
FIG. 14 is a flowchart showing an exemplary timeout process for when a timeout occurs.

FIG. 14 is a flowchart showing an exemplary timeout process for when a timeout occurs. The timeout process is activated by an interrupt when a timeout occurs.

At step S1401, the wireless communication functional unit 403 transmits an IEEE 802.11n capability confirmation request. At step S1402, the wireless communication functional unit 403 determines whether an IEEE 802.11n capability confirmation response has been received. If received, the processing proceeds to step S1407, where the wireless communication functional unit 403 resets (starts) the timer. On the other hand, if not received, the processing proceeds to step S1403.

At step S1403, the wireless communication functional unit 403 transmits an IEEE 802.11n reestablishment request. At step S1404, the wireless communication functional unit 403 determines whether a rejection response signal has been received as an IEEE 802.11n reestablishment response. When a rejection response signal has been received, the processing proceeds to step S1407 in order to cancel the switching of communication standards. On the other hand, when a rejection response signal has not been received, the processing proceeds to step S1405.

At step S1405, the wireless communication functional unit 403 initializes the current wireless settings, and leaves the IEEE 802.11b network. At step S1406, the wireless communication functional unit 403 starts transmitting beacons compliant with IEEE 802.11n and reestablishes a network.

As described above, the second embodiment also exhibits superior effects similar to the first embodiment. In particular, determining whether all communication apparatuses connected to a network are compatible with a higher communication standard is facilitated by storing identification information and capability information indicating compatibly with the higher communication standard for each communication apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-025736, filed Feb. 5, 2008, which is hereby incorporated by reference herein in its entirety.

What is claimed is:

1. A communication apparatus compatible with a first communication standard and a second communication standard being different from the first communication standard, the communication apparatus comprising:
   a participating unit configured to participate in a wireless network compatible with the first communication standard, the wireless network having been established in advance by a first other communication device which is not compatible with the second communication standard;
   a determining unit configure to determine that other communication device being not compatible with the second communication standard including at least the first other communication device has left the wireless network in which the communication apparatus is participating; and
   an establishing unit configured to leave the wireless network compatible with the first communication standard in responding to a result of a determination of the determining unit, and newly establish a wireless network compatible with the second communication standard;
   a transmission unit configured to transmit a switching signal which indicates switching from a wireless network compatible with the first communication standard to a network compatible with the second communication standard; and
   a judging unit configured to judge whether or not other communication device compatible with the second communication standard rejects the switching from a wireless network compatible with the first communication standard to a network compatible with the second communication standard based on a response to the switching signal, from the other communication device compatible with the second communication standard,
   wherein the establishing unit newly establishes a wireless network compatible with the second communication standard when the other communication device compatible with the second communication standard does not reject the switching from a wireless network compatible with the first communication standard to a network compatible with the second communication standard.

2. The communication apparatus according to claim 1, further comprising
   a confirming unit configured to confirm whether or not a second other communication device participating in the wireless network is compatible with the second communication standard.

3. The communication apparatus according to claim 2, wherein the confirming unit is further configured to send an inquiry signal for inquiring whether or not the second other communication device is compatible with the second communication standard and confirm whether or not the second other communication device participating in the wireless network is compatible with the second communication standard according to a response of the second other communication device to the inquiry signal.

4. The communication apparatus according to claim 3, wherein the confirming unit is further configured to determine that the second other communication device is not compatible with the second communication standard if the second other communication device sends back an explicit response signal indicating incompatibility with the second communication standard or if the second other communication device shows an implicit response by not sending a reply to the inquiry signal.

5. The communication apparatus according to claim 3, further comprising
   a broadcast unit configured to transmit a broadcast signal in the wireless network, wherein the inquiry signal is transmitted with the broadcast signal.

6. The communication apparatus according to claim 2, wherein the establishing unit is further configured not to switch from a wireless network compatible with the first communication standard to a network compatible with the second communication standard when the switching is rejected.

7. The communication apparatus according to claim 2, further comprising:
   a storage unit configured to associate identification information for identifying the second other communication device which is included in the broadcast signal from the second other communication device, with standard information indicating whether or not the second other communication device is compatible with the second communication standard, and store the associated information;
   a deciding unit configured to decide whether or not the second other communication device has left a wireless network compatible with the first communication standard based on whether or not a broadcast signal can be received from the second other communication device;
   a removing unit configure to remove the standard information associated with identification information for identifying the second other communication device which has left the wireless network,
   wherein the establishing unit is further configured to newly establish a wireless network compatible with the second communication standard when all other communication devices being not compatible with the second communication standard have left the wireless communication network compatible with the first communication standard based on the remove by the removing unit.

8. The communication apparatus according to claim 1, wherein a communication speed of the second communication standard is faster than that of the first communication standard.

9. A communication system comprising a plurality of communication devices, at least one of the plurality of communication devices being compatible with a first communication standard and a second communication standard being different from the first communication standard, the at least one of the plurality of communication devices including:
a participating unit configured to participate in a wireless network compatible with the first communication standard, the wireless network been established in advance by a first other communication device which is not compatible with the second communication standard;
a determining unit configure to determine that other communication device being not compatible with the second communication standard including at least the first other communication device has left the wireless network in which the communication apparatus is participating; and
an establishing unit configured to leave the wireless network compatible with the first communication standard in responding to a result of a determination of the determining unit, and newly establish a wireless network compatible with the second communication standard;
a transmission unit configured to transmit a switching signal which indicates switching from a wireless network compatible with the first communication standard to a network compatible with the second communication standard; and
a judging unit configured to judge whether or not other communication device compatible with the second communication standard rejects the switching from a wireless network compatible with the first communication standard to a network compatible with the second communication standard based on a response to the switching signal, from the other communication device compatible with the second communication standard,
wherein the establishing unit newly establishes a wireless network compatible with the second communication standard when the other communication device compatible with the second communication standard does not reject the switching from a wireless network compatible with the first, communication standard to a network compatible with the second communication standard.

10. A wireless network establishing method in a communication apparatus compatible with a first communication standard and a second communication standard being different from the first communication standard comprising the steps of:
participating in a wireless network compatible with the first communication standard, the wireless network having been established in advance by a first other communication device which is not compatible with the second communication standard;
determining that other communication device being not compatible with the second communication standard including at least the first other communication device has left the wireless network in which the communication apparatus is participating;
leaving the wireless network compatible with the first communication standard in responding to a result of a determination of the step of determining; and
newly establishing a wireless network compatible with the second communication standard;
transmitting a switching signal which indicates switching from a wireless network compatible with the first communication standard to a network compatible with the second communication standard; and
judging whether or not other communication device compatible with the second communication standard rejects the switching from a wireless network compatible with the first communication standard to a network compatible with the second communication standard based on a response to the switching signal, from the other communication device compatible with the second communication standard,
wherein the establishing newly establishes a wireless network compatible with the second communication standard when the other communication device compatible with the second communication standard does not reject the switching from a wireless network compatible with the first communication standard to a network compatible with the second communication standard.

11. A computer-readable non-transitory-recording medium storing a program for causing a computer to execute a wireless network establishing method in a communication apparatus compatible with a first communication standard and a second communication standard being different from the first communication standard comprising the steps of:
participating in a wireless network compatible with the first communication standard, the wireless network having been established in advance by a first other communication device which is not compatible with the second communication standard;
determining that other communication device being not compatible with the second communication standard including at least the first other communication device has left the wireless network in which the communication apparatus is participating;
leaving the wireless network compatible with the first communication standard in responding to a result of a determination of the step of determining; and
newly establishing a wireless network compatible with the second communication standard;
transmitting a switching signal which indicates switching from a wireless network compatible with the first communication standard to a network compatible with the second communication standard; and
judging whether or not other communication device compatible with the second communication standard rejects the switching from a wireless network compatible with the first communication standard to a network compatible with the second communication standard based on a response to the switching signal, from the other communication device compatible with the second communication standard,
wherein the establishing newly establishes a wireless network compatible with the second communication standard when the other communication device compatible with the second communication standard does not reject the switching from a wireless network compatible with the first communication standard to a network compatible with the second communication standard.

12. A communication apparatus comprising:
a participating unit configured to participate in a first wireless network compatible with a first communication standard;
a communication unit configured to communicate in the first wireless network, with a first communication terminal compatible with a second communication standard, which supports a communication speed being higher than a communication speed supported by the first communication standard, and a second communication terminal incompatible with the second communication standard;
a detection unit configured to detect that the second communication terminal has left the first wireless network;
a leaving unit configured to leave the first wireless network in a case that the detection unit detects that the second communication terminal has left the first wireless network;
an establishing unit configured to newly establish a second network compatible with the second communication standard in a case that the detection unit detects that the second communication terminal has left the first wireless network; and
a transmission device which transmits a switching signal that indicates switching from the first network compatible with the first network to the second network compatible with the second network
wherein the communication unit communicates with the first communication terminal in the second network in a case that the second network has been newly established by the establishing unit, and
wherein said establishing unit makes said communication apparatus to leave from the first wireless network, and newly establishes the second network compatible with the second communication standard based on a reply from the other communication terminal corresponding to the switching signal transmitted by the transmission device.

13. The communication apparatus according to claim 12, wherein said establishing unit neither makes the communication apparatus to leave from the first wireless network, nor newly establishes the second network compatible with the second communication standard when switching to the second communication standard is rejected in response to the switching signal.

14. The communication apparatus according to claim 12, wherein said establishing unit makes said communication apparatus to leave from the first wireless network, and establishes the second network, said communication unit communicates with the first communication terminal via the second network when the detection unit has detected that all other communication terminals incompatible with the second communication standard have left the first network.

15. The communication apparatus according to claim 12, further comprising a determination unit,
wherein the determination unit transmits, to another communication terminal participating in the first network, an inquiry signal for inquiring whether the other communication apparatus is compatible with the second communication standard, and determines whether the other communication apparatus is compatible with the second communication standard according to a response to the inquiry signal by the other communication apparatus.

16. The communication apparatus according to claim 15, wherein said determination unit determines that the other communication terminal is incompatible with the second communication standard if an explicit response signal indicating incompatibility with the second communication standard is received from the other communication terminal or if there is an implicit response whereby a reply to the inquiry signal is not received.

17. The communication apparatus according to claim 15, further comprising a broadcast device which transmits a broadcast signal when a turn of the communication apparatus arrives to transmit the broadcast signal, which each of a plurality of communication apparatuses participating in the first wireless network transmits in order, wherein
the inquiry signal is transmitted following transmission of the broadcast signal by the broadcast device.

18. The communication apparatus according to claim 12, further comprising:
a storage device configured to store identification information on another communication apparatus included in a broadcast signal received from the other communication apparatus in association with information indicating whether the other communication apparatus is compatible with the second communication standard, and
a determination unit, wherein
said determination unit determines whether the other communication apparatus has left the first wireless network based on whether a broadcast signal was received from the other communication apparatus, and
said detection unit judges that all communication apparatuses incompatible with the second communication standard have left the first wireless network as a result of deleting, from the storage device, the information corresponding to the identification information of other communication apparatuses that have left the first wireless network.

19. A wireless network establishing method in a communication apparatus, the method comprising the steps of:
participating in a first wireless network compatible with a first communication standard;
communicating in the first wireless network, with a first communication terminal compatible with a second communication standard different from the first communication standard, which supports a communication speed being higher than a communication speed supported by the first communication standard, and a second communication terminal incompatible with the second communication standard;
detecting that the second communication terminal has left the first wireless network;
leaving the first wireless network in a case that the detection unit detects that the second communication terminal has left the first wireless network;
newly establishing a second network compatible with the second communication standard in a case that the detection unit detects that the second communication terminal has left the first wireless network; and
transmitting a switching signal that indicates switching from the first network compatible with the first network to the second network compatible with the second network
wherein the communicating step comprises communicating with the first communication terminal in the second network in a case that the second network has been newly established by the establishing unit, and
wherein the establishing step causes said communication apparatus to leave the first wireless network, and newly establishes the second network compatible with the second communication standard based on a reply from the other communication terminal corresponding to the switching signal transmitted by the transmission device.

20. A computer-readable non-transitory recording medium storing a program for causing a computer to execute a network establishing method of a communication apparatus according to claim 19.

* * * * *